United States Patent
Cheng et al.

(10) Patent No.: US 9,405,420 B2
(45) Date of Patent: Aug. 2, 2016

(54) METHOD FOR CONTROLLING A TOUCH PANEL HAVING BUTTON ELECTRODES AND SENSING ELECTRODES IN A SAME CONDUCTIVE LAYER

(71) Applicant: TIANJIN FUNAYUANCHUANG TECHNOLOGY CO.,LTD., Tianjin (CN)

(72) Inventors: Chien-Yung Cheng, New Taipei (TW);
Po-Sheng Shih, New Taipei (TW);
Li-Min Chao, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 65 days.

(21) Appl. No.: 14/552,882

(22) Filed: Nov. 25, 2014

(65) Prior Publication Data
US 2015/0145825 A1   May 28, 2015

(30) Foreign Application Priority Data
Nov. 28, 2013   (CN) .......................... 2013 1 0615650

(51) Int. Cl.
*G06F 3/044*   (2006.01)
*G06F 3/041*   (2006.01)

(52) U.S. Cl.
CPC .............. *G06F 3/044* (2013.01); *G06F 3/0416* (2013.01)

(58) Field of Classification Search
CPC ....... G06F 3/044; G06F 3/041; G06F 3/0416; G06F 3/0412; G06F 3/0418; G06F 3/017; G06F 1/13338; G06F 1/169
See application file for complete search history.

(56) References Cited

U.S. PATENT DOCUMENTS

| | | | | |
|---|---|---|---|---|
| 2008/0007533 | A1* | 1/2008 | Hotelling | G06F 3/044 345/173 |
| 2009/0174650 | A1* | 7/2009 | Choi | G06F 3/0418 345/104 |
| 2013/0321296 | A1* | 12/2013 | Lee | G06F 3/041 345/173 |
| 2014/0210776 | A1* | 7/2014 | Kuroiwa | G06F 3/044 345/174 |
| 2014/0253501 | A1* | 9/2014 | Noguchi | G02F 1/13338 345/174 |
| 2015/0130762 | A1* | 5/2015 | Wang | G06F 3/0416 345/174 |
| 2015/0234502 | A1* | 8/2015 | Kubo | G06F 3/044 345/174 |
| 2016/0011692 | A1* | 1/2016 | Heim | G06F 3/017 345/174 |

* cited by examiner

*Primary Examiner* — Dwayne Bost
*Assistant Examiner* — Darlene M Ritchie
(74) *Attorney, Agent, or Firm* — ScienBiziP, P.C.

(57) ABSTRACT

A method for controlling a touch panel is disclosed. A first driving signal is applied to the driving electrodes to obtain a number of first electrical signals corresponding to a number of conductive stripes of touch panel. The first electrical signals are converted into a number of first digital signals by digital analog conversion with a first factor. A second driving signal is applied to a number of driving electrodes to obtain a number of second electrical signals corresponding to a number of button electrodes of the touch panel. The second electrical signals are converted into a number of second digital signals by digital analog conversion with a second factor. The second factor is smaller than the first factor.

20 Claims, 8 Drawing Sheets

|    | 0   | 1    | 2   | 3   | 4   | 5   | 6   | 7   | 8    | 9   |
|----|-----|------|-----|-----|-----|-----|-----|-----|------|-----|
| 0  | 522 | 499  | 489 | 498 | 502 | 487 | 545 | 540 | 506  | 516 |
| 1  | 484 | 487  | 477 | 484 | 485 | 470 | 524 | 518 | 485  | 489 |
| 2  | 502 | 505  | 497 | 504 | 504 | 488 | 540 | 535 | 501  | 505 |
| 3  | 482 | 484  | 474 | 482 | 482 | 467 | 519 | 510 | 478  | 484 |
| 4  | 491 | 493  | 483 | 493 | 492 | 479 | 531 | 523 | 488  | 495 |
| 5  | 483 | 487  | 477 | 485 | 486 | 472 | 525 | 516 | 482  | 488 |
| 6  | 490 | 493  | 484 | 491 | 493 | 478 | 532 | 523 | 490  | 495 |
| 7  | 485 | 489  | 479 | 486 | 486 | 471 | 525 | 517 | 483  | 488 |
| 8  | 493 | 497  | 486 | 493 | 494 | 478 | 533 | 524 | 488  | 483 |
| 9  | 492 | 494  | 483 | 490 | 491 | 474 | 527 | 518 | 474  | 433 |
| 10 | 499 | 503  | 493 | 501 | 502 | 485 | 539 | 530 | 490  | 468 |
| 11 | 486 | 489  | 479 | 489 | 491 | 475 | 530 | 522 | 487  | 489 |
| 12 | 500 | 500  | 491 | 499 | 499 | 482 | 535 | 527 | 493  | 496 |
| 13 | 489 | 491  | 479 | 487 | 487 | 471 | 523 | 517 | 484  | 489 |
| 14 | 493 | 496  | 486 | 496 | 495 | 479 | 533 | 525 | 491  | 495 |
| 15 | 487 | 490  | 480 | 488 | 488 | 474 | 527 | 520 | 485  | 489 |
| 16 | 499 | 505  | 493 | 501 | 501 | 488 | 542 | 534 | 501  | 505 |
| 17 | 532 | 548  | 528 | 538 | 537 | 535 | 574 | 567 | 547  | 539 |
| 18 | 600 | 1008 | 621 | 632 | 581 | 971 | 667 | 663 | 1006 | 610 |

FIG. 1

| Button | 0 | 1 | 2 |
|---|---|---|---|
|  | 832 | 846 | 867 |

|  | 0 | 1 | 2 | 3 | 4 | 5 | 6 | 7 | 8 | 9 |
|---|---|---|---|---|---|---|---|---|---|---|
| 0 | 550 | 551 | 615 | 625 | 564 | 536 | 644 | 633 | 551 | 563 |
| 1 | 497 | 499 | 569 | 582 | 523 | 499 | 610 | 599 | 522 | 536 |
| 2 | 492 | 496 | 566 | 579 | 520 | 497 | 608 | 598 | 520 | 531 |
| 3 | 477 | 481 | 550 | 563 | 503 | 481 | 592 | 581 | 499 | 517 |
| 4 | 484 | 487 | 556 | 568 | 508 | 487 | 598 | 588 | 508 | 523 |
| 5 | 486 | 491 | 561 | 573 | 514 | 491 | 603 | 595 | 518 | 528 |
| 6 | 482 | 489 | 558 | 569 | 512 | 490 | 602 | 595 | 520 | 534 |
| 7 | 475 | 483 | 553 | 565 | 505 | 486 | 598 | 587 | 513 | 528 |
| 8 | 461 | 468 | 540 | 552 | 492 | 473 | 589 | 583 | 508 | 526 |
| 9 | 460 | 465 | 537 | 548 | 487 | 467 | 579 | 570 | 495 | 507 |
| 10 | 487 | 492 | 562 | 574 | 517 | 492 | 605 | 598 | 524 | 536 |
| 11 | 496 | 501 | 571 | 585 | 526 | 503 | 613 | 603 | 525 | 542 |
| 12 | 493 | 498 | 568 | 579 | 522 | 498 | 609 | 598 | 522 | 535 |
| 13 | 500 | 505 | 576 | 587 | 529 | 503 | 615 | 605 | 527 | 541 |
| 14 | 491 | 497 | 565 | 576 | 516 | 492 | 606 | 595 | 516 | 529 |
| 15 | 522 | 528 | 594 | 606 | 546 | 526 | 633 | 620 | 542 | 554 |
| 16 | 488 | 496 | 560 | 570 | 508 | 491 | 597 | 587 | 516 | 527 |
| 17 | 571 | 602 | 645 | 654 | 594 | 594 | 676 | 662 | 607 | 597 |

FIG. 7

```
                                                          ┌─ S20
┌─────────────────────────────────────────────┐
│ Applying a first driving signal V₁ to the first driving │
│ electrodes one by one, obtaining a plurality of first   │
│ electrical signals by scanning the plurality of         │
│ sensing electrodes 162 one by one, and converting       │
│ the plurality of first electrical signals into a        │
│ plurality of first digital signals by digital analog    │
│ conversion, wherein the plurality of first electrical   │
│ signals are converted into the plurality of first       │
│ digital signals by a first amplified factor κ           │
└─────────────────────────────────────────────┘
                          │
                          ▼                      ┌─ S21
┌─────────────────────────────────────────────┐
│ Applying a second driving signal V₂ to the second       │
│ driving electrodes one by one, obtaining a plurality    │
│ of second electrical signals by scanning the            │
│ plurality of sensing electrodes 162 one by one,         │
│ and converting the plurality of second electrical       │
│ signals into a plurality of second digital signals by   │
│ digital analog conversion, wherein the plurality of     │
│ second electrical signals are converted into the        │
│ plurality of second digital signals by a second         │
│ amplified factor κ', and V₂ is smaller than V₁          │
└─────────────────────────────────────────────┘
```

FIG. 8

METHOD FOR CONTROLLING A TOUCH PANEL HAVING BUTTON ELECTRODES AND SENSING ELECTRODES IN A SAME CONDUCTIVE LAYER

RELATED APPLICATIONS

This application claims all benefits accruing under 36 U.S.C. §119 from China Patent Application No. 201310615650.2, filed on Nov. 28, 2013 in the China Intellectual Property Office, the disclosure of which is incorporated herein by reference. This application is related to applications entitled, "METHOD FOR CONTROLLING TOUCH PANEL," filed Ser. No. 14/552,898.

BACKGROUND

The present disclosure relates to a method for controlling a touch panel.

FIELD

Touch sensing technology is capable of providing a natural interface between an electronic system and a user, and has found widespread applications in various fields, such as mobile phones, personal digital assistants, automatic teller machines, game machines, medical devices, liquid crystal display devices, and computing devices.

There are different types of touch panels, such as a capacitive touch panel. The capacitive touch panels generally comprise a driving layer and a sensing layer opposite to the driving layer. The driving layer comprises a first conductive layer and a plurality of driving electrodes located on a side of the first conductive layer along a first direction. The first conductive layer comprises a plurality of first conductive paths spaced from each other and oriented along a second direction perpendicular to the first direction. The sensing layer comprises a second conductive layer, a plurality of sensing electrodes and a plurality of button electrodes. The second conductive layer comprises a plurality of second conductive paths spaced from each other and oriented along the first direction. The plurality of sensing electrodes are located on a first side of the second conductive layer parallel to the second direction, and the plurality of button electrodes are located on second side of the second conductive layer opposite to the first side. The plurality of button electrodes can be used as a plurality of virtual push-buttons in an Android smart phone.

In controlling the capacitive touch panel, a same driving signal is applied to the plurality of driving electrodes one by one, at the same time a plurality of electrical signals are obtained by the plurality of sensing electrodes; and then the plurality of electrical signals is converted into a plurality of digital signals by digital analog conversion with a same amplified factor to obtain the coordinates of touch spots on the touch panel. However, as illustrated in FIG. 1, because an area of each of the button electrode is much greater than an area of each of second conductive path, the electrical signals corresponding to the button electrodes, e.g. row No. 18 column No. 1 and row No. 18 column No. 8, are much greater than the electrical signals corresponding to the second conductive path, which would greatly influence the touch-controlling precision of capacitive touch panel.

What is needed, therefore, is to provide a method for controlling the touch panel, which can overcome the above-described shortcomings.

BRIEF DESCRIPTION OF THE DRAWINGS

Implementations of the present technology will now be described, by way of example only, with reference to the attached figures, wherein:

FIG. 1 shows a plurality of digital signals obtained by a traditional method for controlling a touch panel.

FIG. 7 shows a plurality of digital signals obtained by the method of FIG. 5.

FIG. 8 shows a flow chart of another embodiment of a method for controlling the touch panel shown in FIG. 4.

DETAILED DESCRIPTION

Figure 2:
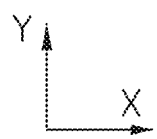
FIG. 2 shows a schematic structural view of one embodiment of a driving layer of a touch panel.
Figure 2:
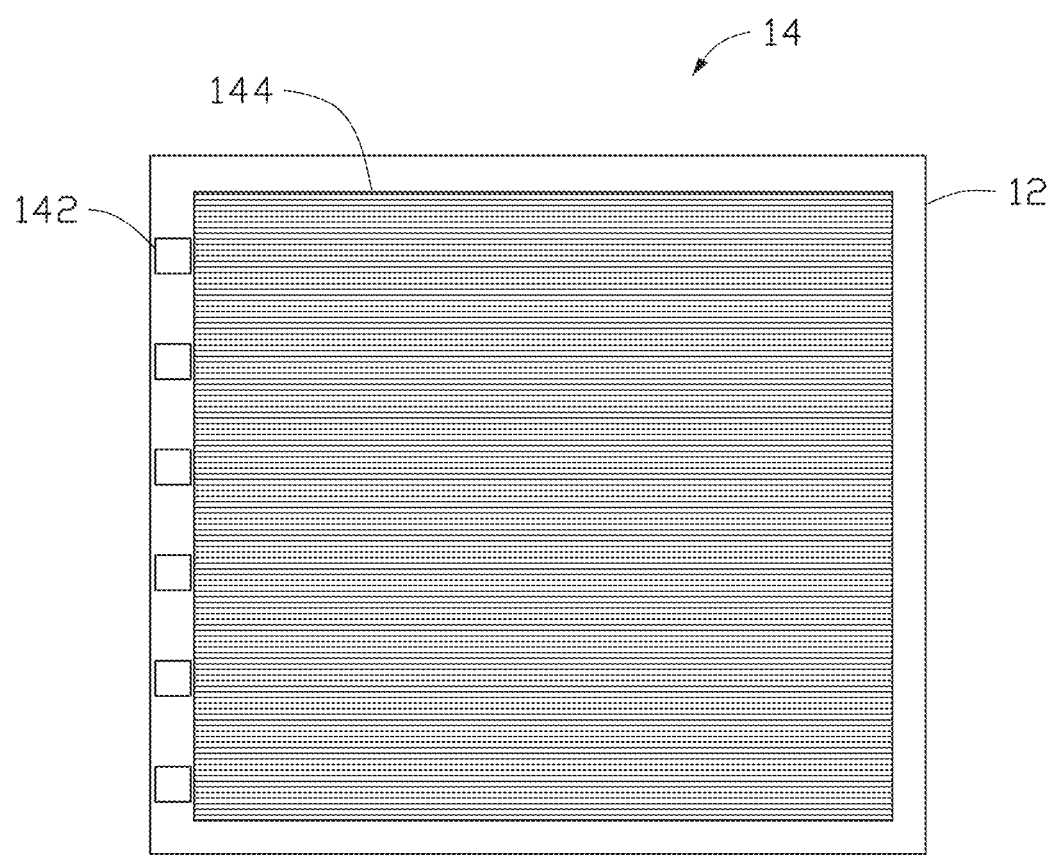

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like.

Figure 3:
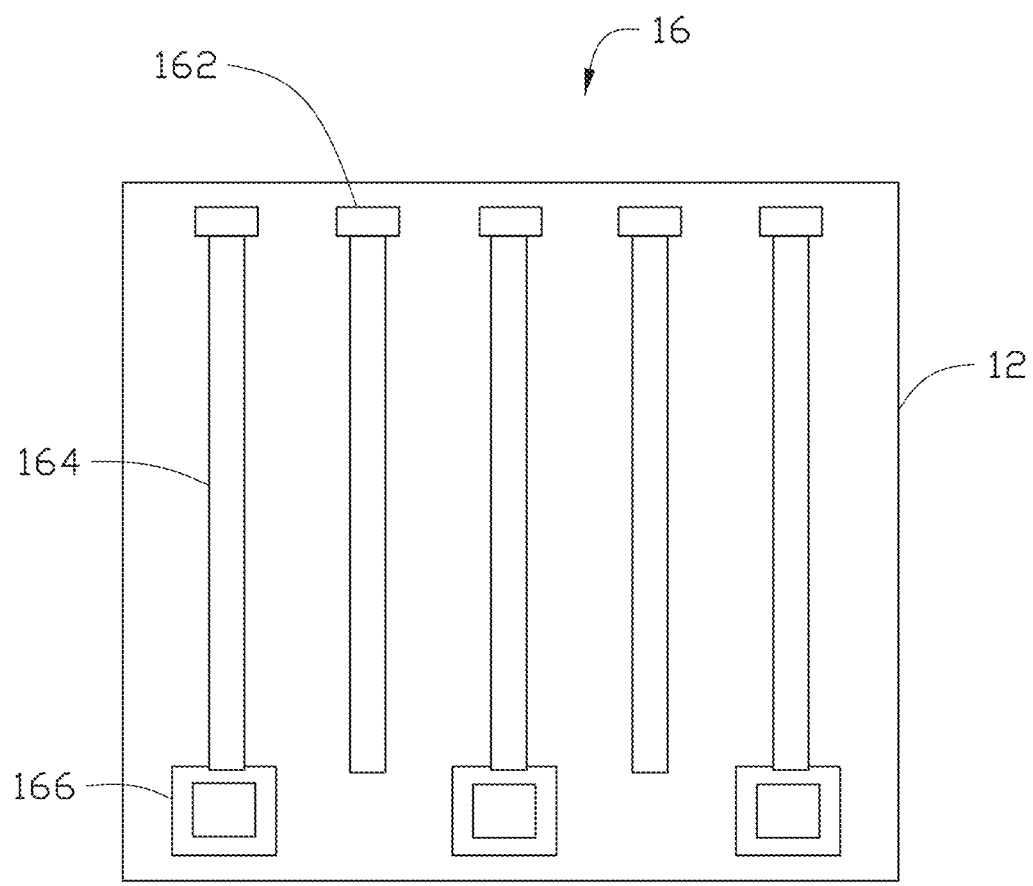
FIG. 3 shows a schematic structural view of one embodiment of a sensing layer of a touch panel.
Figure 4:
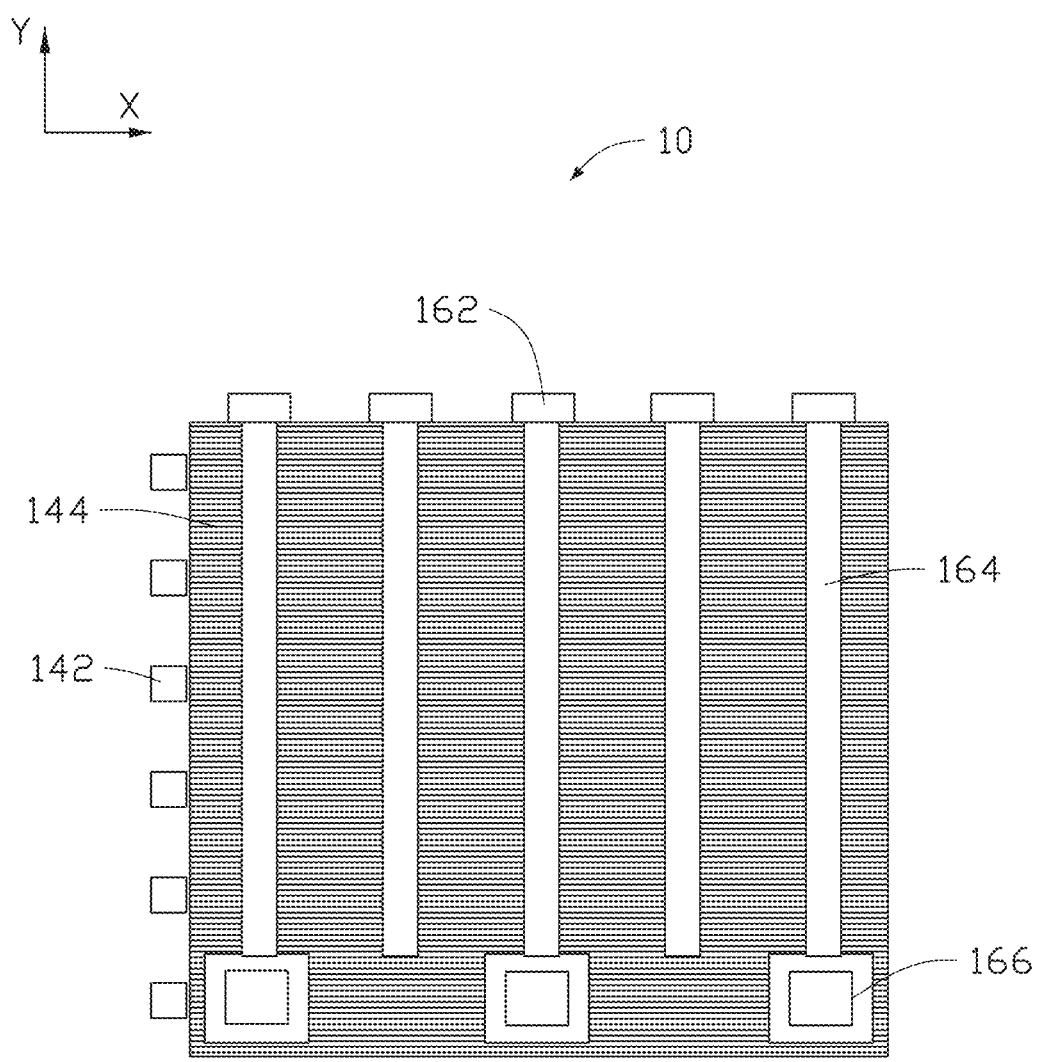
FIG. 4 shows a schematic structural view of one embodiment of a touch panel.

FIGS. 2-4 illustrate that a touch panel 10 of one embodiment is provided. The touch panel 10 comprises a substrate 12, a driving layer 14, a sensing layer 16 and a controlling IC electrically connected to the driving layer 14 and the sensing layer 16. The substrate 12 comprises a first surface and a second surface opposite to the first surface. The driving layer 14 is located on the first surface. The sensing layer 16 is located on the second surface.

The driving layer 14 comprises a plurality of driving electrodes 142 and a conductive layer 144. The plurality of driving electrodes 142 are located on a side of the conductive layer 144 along a direction Y, and are electrically connected to the controlling IC. Thus, the conductive layer 144 can be electrically connected to the controlling IC by the plurality of driving electrodes 142. The conductive layer 144 consists of at least one layer of carbon nanotube film drawn directly from a carbon nanotube array. The carbon nanotube film consists of a plurality of carbon nanotubes joined end to end by van der Waals force and oriented along a direction X substantially perpendicular to the direction Y. Thus, a plurality of conductive paths along the direction X can be formed. In some embodiments, the direction X is crossed with the direction Y. The carbon nanotube film is a free-standing structure. That is, the term 'free-standing' includes films that do not have to be supported by a substrate.

The carbon nanotube film has minimum impedance along the X direction and maximum impedance along the Y direction so as to have anisotropic impedance. In one embodiment, the conductive layer 144 consists of one layer of carbon nanotube film. The conductive layer 144 can also consist of a plurality of indium tin oxide (ITO) stripes or metal stripes spaced from each other and oriented along the direction X.

The sensing layer 16 comprises a plurality of sensing electrodes 162, a plurality of parallel conductive stripes 164 and a plurality of button electrodes 166. The plurality of conductive stripes 164 are oriented along the direction Y and spaced from each other. A material of the plurality of conductive stripes 164 can be ITO or metal. In one embodiment, the plurality of conductive stripes 164 are a plurality of parallel ITO stripes oriented along the direction Y. Each of the plurality of sensing electrodes 162 is located on a first end of each of the plurality of conductive stripes 164 respectively, and is electrically connected to the controlling IC. Thus, the plurality of conductive stripes 164 can be electrically connected to the controlling IC by the plurality of sensing electrodes 162. Each of the plurality of button electrodes 166 is located on a second end of the plurality of conductive stripes 164 opposite to the first end. A number of the plurality of button electrodes 166 can be equal to or less than a number of the plurality of parallel conductive stripes 164.

For convenience of description, the driving electrodes 142 used to drive the plurality of button electrodes 166 are defined as second driving electrodes, and the other driving electrodes 142 are defined as first driving electrodes. The driving electrodes 142 corresponding to the plurality of button electrodes 166 along the direction X are used to drive the plurality of button electrodes 166 and can be defined as the second driving electrodes.

Figure 5:
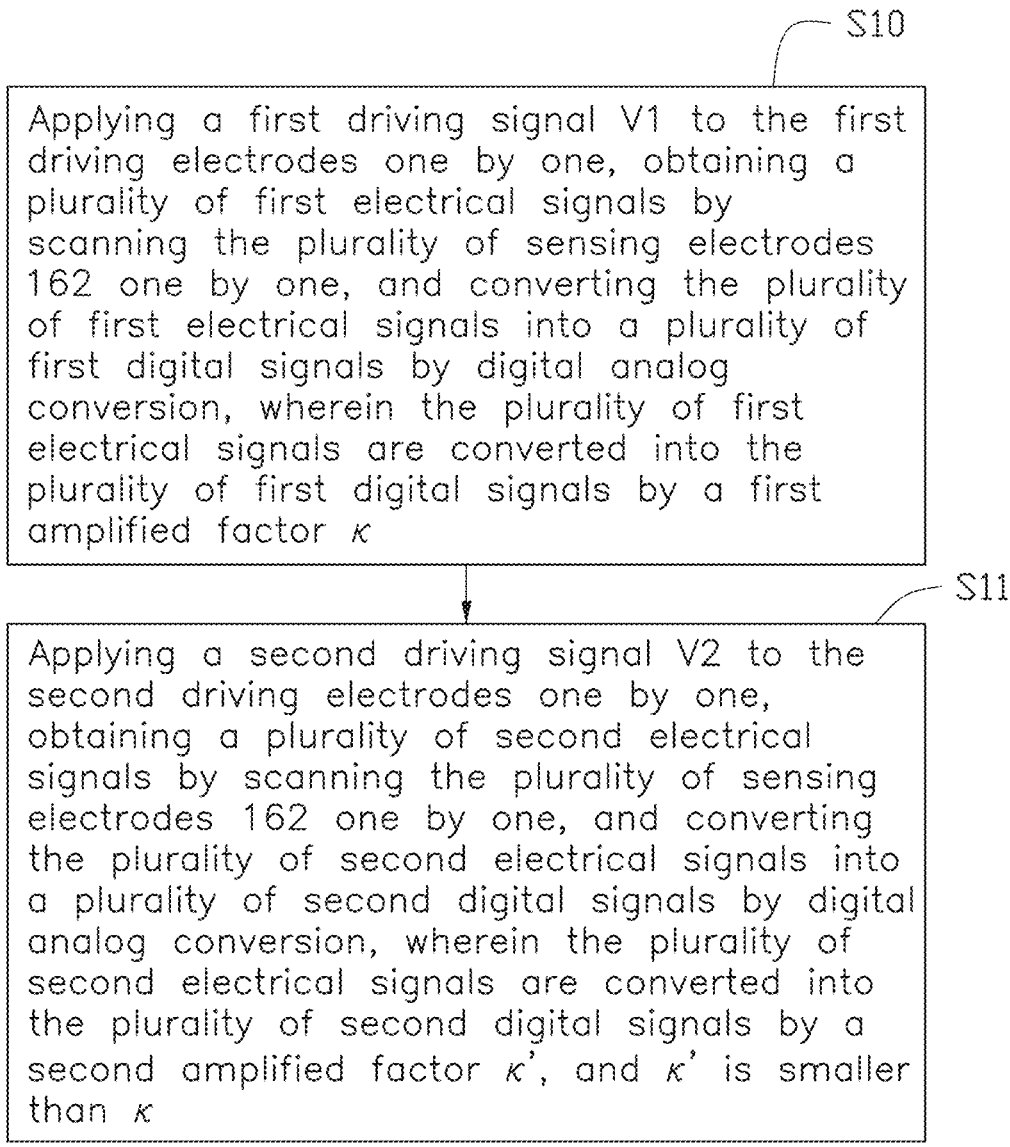
FIG. 5 shows a flow chart of one embodiment of a method for controlling the touch panel shown in FIG. 4.

FIG. 5 illustrates that a method for controlling the touch panel 10 of one embodiment, comprises the steps of:

S10: applying a first driving signal $V_1$ to the first driving electrodes one by one, obtaining a plurality of first electrical signals by scanning the plurality of sensing electrodes 162 one by one, and converting the plurality of first electrical signals into a plurality of first digital signals by digital analog conversion, wherein the plurality of first electrical signals are converted into the plurality of first digital signals by a first amplified factor $\kappa$; and S11: applying a second driving signal $V_2$ to the second driving electrodes one by one, obtaining a plurality of second electrical signals by scanning the plurality of sensing electrodes 162 one by one, and converting the plurality of second electrical signals into a plurality of second digital signals by digital analog conversion, wherein the plurality of second electrical signals are converted into the plurality of second digital signals by a second amplified factor $\kappa'$, and $\kappa'$ is smaller than $\kappa$.

In step S10, when the first driving signal $V_1$ is applied to one of the first driving electrodes, the other first driving electrodes without the applied first driving signal $V_1$ and the second driving electrodes can be connected to ground or floating. In one embodiment, when the first driving signal $V_1$ is applied to one of the first driving electrodes, the other first driving electrodes without the applied first driving signal $V_1$ and the second driving electrodes are connected to ground.

The plurality of first electrical signals is converted into the plurality of first digital signals by the controlling IC. It is to be noted that, the greater the first amplified factor $\kappa$ is, a greater number of first electrical signals can be obtained. FIG. 5 illustrates that the $V_C$ curve represents voltage change of a coupled capacitance between the driving layer 14 and the plurality of conductive stripes 164. During a period $T_1$, the first driving signal $V_1$ is applied to the plurality of conductive stripes 164 by the controlling IC to charge the coupled capacitance between the driving layer 14 and the plurality of conductive stripes 164. At the same time, the plurality of sensing electrodes 162 are scanned by the controlling IC one by one to obtain the plurality of first electrical signals. The values of the plurality of first electrical signals are depended upon the values of first driving signal $V_1$. That is, the greater the first driving signal $V_1$ applied, a greater number of first electrical signals can be obtained. In one embodiment, the values of the first driving signal $V_1$ is $V_0$. During a period $T_2$, the coupled capacitance between the driving layer 14 and the plurality of conductive stripes 164 discharges. It is to be noted that, when touch movements are applied on the plurality of conductive stripes 164 of the touch panel 10, coordinates of the touch movements can be obtained by the plurality of first digital signals.

In step S11, when the second driving signal $V_2$ is applied to one of the second driving electrodes, the other second driving electrodes without the applied first driving signal $V_2$ and all of the first driving electrodes can be connected to ground or floating. In one embodiment, when the second driving signal $V_2$ is applied to one of the second driving electrodes, the other second driving electrodes without the applied first driving signal $V_2$ and all of the first driving electrodes are connected to ground.

The plurality of second electrical signals are converted into a plurality of second digital signals by the controlling IC. It is to be noted that, the smaller the second amplified factor $\kappa'$ is, a smaller number of second electrical signals can be obtained. Because the second amplified factor $\kappa'$ is smaller than the first amplified factor $\kappa$, the values of the plurality of second electrical signals can be substantially equal to the values of the plurality of first electrical signals. Thus, a touch-controlling precision of touch panel can be improved. In some embodiments, the second amplified factor $\kappa'$ and the first amplified factor $\kappa$ satisfy: $3\kappa' \geq \kappa > \kappa'$. In one embodiment, the second amplified factor $\kappa'$ and the first amplified factor $\kappa$ satisfy: $\kappa = 2\kappa'$.

Figure 6:
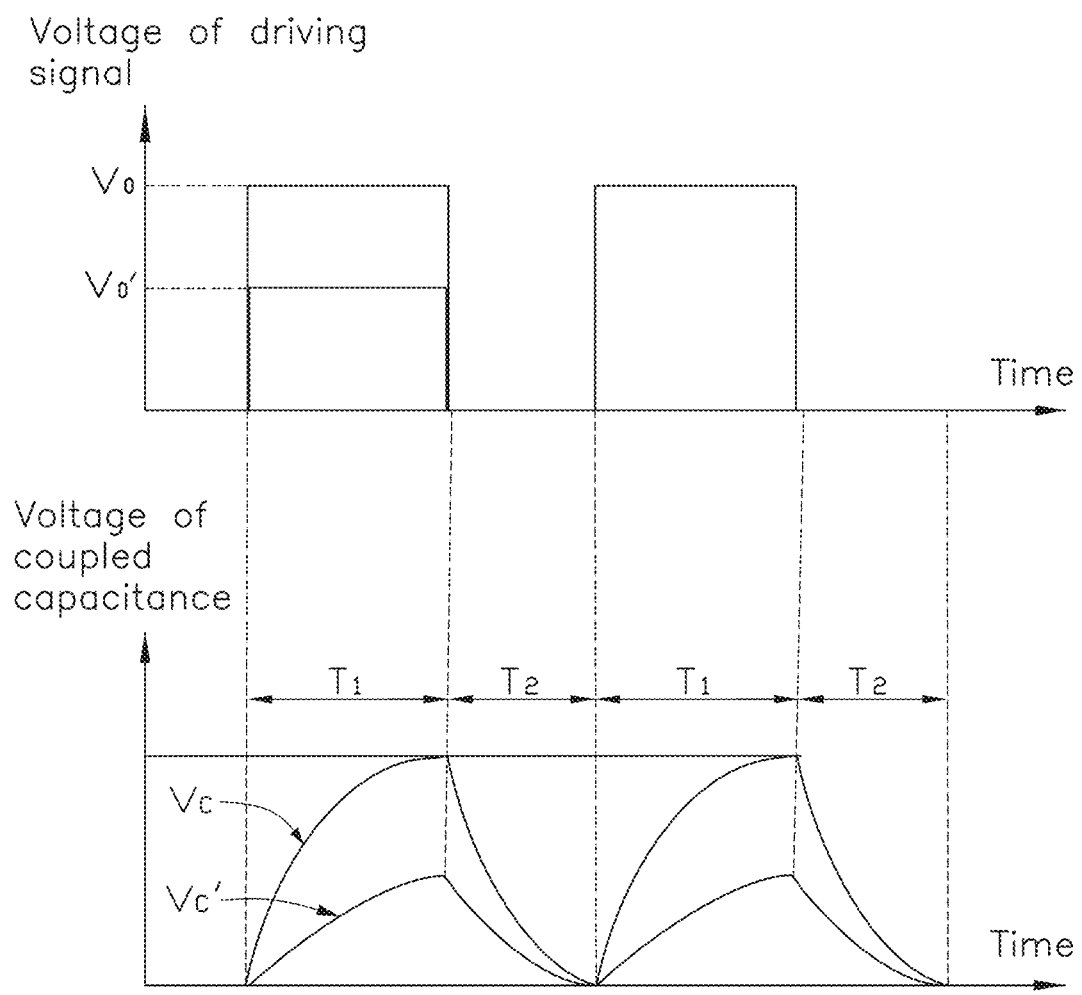
FIG. 6 shows a chart of voltage changes of coupling capacitance during the controlling process of the touch panel shown in FIG. 5.

FIG. 6 illustrates that the $V_C'$ curve represents voltage change of a coupled capacitance between the driving layer 14 and the plurality of button electrodes 166. During the period $T_1$, the second driving signal $V_2$ is applied to the second driving electrodes by the controlling IC to charge the coupled capacitance between the driving layer 14 and the plurality of button electrodes 166. At the same time, the plurality of sensing electrodes 162 are scanned by the controlling IC to obtain the plurality of second electrical signals. The values of the plurality of second electrical signals are depended upon the values of second driving signal $V_2$. That is, the smaller the values of the second driving signal $V_2$ are, the smaller the values of the plurality of second electrical signals can be obtained. The values of the second driving signal $V_2$ can be smaller than or equal to the values of the first driving signal $V_1$. When values of the second driving signal $V_2$ is smaller than the values of the first driving signal $V_1$, the coupled capacitance between the driving layer 14 and the plurality of button electrodes 166 cannot be fully charged. Thus, the values of the plurality of second electrical signals and the plurality of first digital signals can be decreased. In one embodiment, the second driving signal $V_2$ is smaller than $V_0$. During the period $T_2$, the coupled capacitance between the driving layer 14 and the plurality of button electrodes 166 discharges. It is to be noted that, when touch movements are applied on the plurality of button electrodes 166 of the touch panel 10, coordinates of the touch movements can be obtained by the plurality of second digital signals.

FIG. 7 illustrates that a plurality of digital signals of the touch panel 10 is obtained by the above controlling method. It is noted that, the values of the plurality of digital signals corresponding to the plurality of button electrodes 166 can be substantially equal to the values of the plurality of digital signals corresponding to the plurality of conductive stripes 164. Thus, the touching-controlling precision of touch panel 10 can be improved.

FIG. 8 illustrates that a method for controlling the touch panel 10 of another embodiment, comprises the steps of:

S10: applying a first driving signal $V_1$ to the first driving electrodes one by one, obtaining a plurality of first electrical signals by scanning the plurality of sensing electrodes 162 one by one, and converting the plurality of first electrical signals into a plurality of first digital signals by digital analog conversion, wherein the plurality of first electrical signals are converted into the plurality of first digital signals by a first amplified factor κ; and S11: applying a second driving signal $V_2$ to the second driving electrodes one by one, obtaining a plurality of second electrical signals by scanning the plurality of sensing electrodes 162 one by one, and converting the plurality of second electrical signals into a plurality of second digital signals by digital analog conversion, wherein the plurality of second electrical signals are converted into the plurality of second digital signals by a second amplified factor κ', and $V_2$ is smaller than $V_1$.

The steps of S20 and S21 are substantially the same as the steps of S10 and S11, except that the value of the second amplified factor κ' is equal to the value of the first amplified factor κ. That is, the plurality of second electrical signals are only reduced by the decrement of the second driving signal $V_2$. In some embodiments, the first driving signal $V_1$ and the second driving signal $V_2$ satisfies: $3V_2 \geq V_1 > V_2$. In one embodiment, first driving signal $V_1$ and the second driving signal $V_2$ satisfies: $2V_2 = V_1$.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for controlling a touch panel comprising:
providing the touch panel comprising a driving layer and a sensing layer opposite to the driving layer; the driving layer comprising a first conductive layer and a plurality of driving electrodes located on a side of the first conductive layer along a first direction;
the sensing layer comprising a second conductive layer, a plurality of sensing electrodes and a plurality of button electrodes; the plurality of sensing electrodes and the plurality of button electrodes separately located on two opposite sides of the second conductive layer along a second direction crossed with the first direction; wherein the plurality of driving electrodes, configured for driving the plurality of button electrodes, are defined as second driving electrodes; and the other driving electrodes are defined as first driving electrodes;
applying a first driving signal $V_1$ to the first driving electrodes one by one, obtaining a plurality of first electrical signals by scanning the plurality of sensing electrodes one by one, and converting the plurality of first electrical signals into a plurality of first digital signals by digital analog conversion with a first amplified factor κ; and
applying a second driving signal $V_2$ to the second driving electrodes one by one, obtaining a plurality of second electrical signals by scanning the plurality of sensing electrodes one by one, and converting the plurality of second electrical signals into a plurality of second digital signals by digital analog conversion with a second amplified factor κ';
wherein the second amplified factor κ' is smaller than the first amplified factor κ.

2. The method as claimed in claim 1, wherein the first driving signal $V_1$ is applied to one of the first driving electrodes, and the undriven first driving electrodes and the second driving electrodes are connected to ground or floating.

3. The method as claimed in claim 1, wherein the second driving signal $V_2$ is applied to one of the second driving electrodes, and the undriven second driving electrodes and the first driving electrodes are connected to ground or floating.

4. The method as claimed in claim 1, wherein a number of the plurality of button electrodes is less than or equal to a number of the plurality of sensing electrodes.

5. The method as claimed in claim 1, wherein the first direction is perpendicular to the second direction.

6. The method as claimed in claim 1, wherein a relationship between the second amplified factor κ' and the first amplified factor κ is: $3κ' \geq κ > κ'$.

7. The method as claimed in claim 6, wherein the relationship between the second amplified factor κ' and the first amplified factor κ is: $2κ' = κ$.

8. A method for controlling a touch panel comprising:
providing the touch panel comprising a driving layer and a sensing layer opposite to the driving layer; the driving layer comprising a first conductive layer and a plurality of driving electrodes located on a side of the first conductive layer along a first direction;
the sensing layer comprising a second conductive layer, a plurality of sensing electrodes and a plurality of button electrodes; the plurality of sensing electrodes and the plurality of button electrodes separately located on two opposite sides of the second conductive layer along a second direction crossed with the first direction; wherein the plurality of driving electrodes, configured for driving the plurality of button electrodes, are defined as second driving electrodes; and the other driving electrodes are defined as first driving electrodes;
applying a first driving signal $V_1$ to the first driving electrodes one by one, obtaining a plurality of first electrical signals by scanning the plurality of sensing electrodes one by one, and converting the plurality of first electrical signals into a plurality of first digital signals by digital analog conversion with a first amplified factor κ; and
applying a second driving signal $V_2$ to the second driving electrodes one by one, obtaining a plurality of second electrical signals by scanning the plurality of sensing electrodes one by one, and converting the plurality of second electrical signals into a plurality of second digital signals by digital analog conversion with a second amplified factor κ';

wherein the second driving signal $V_2$ is smaller than the first driving signal $V_1$.

9. The method as claimed in claim 8, wherein the first direction is perpendicular to the second direction.

10. The method as claimed in claim 8, wherein a relationship between the second amplified factor κ' and the first amplified factor κ is: $3V_2 \geq V_1 > V_2$.

11. The method as claimed in claim 10, wherein the relationship between the second amplified factor κ' and the first amplified factor κ is: $2V_2 = V_1$.

12. A method for controlling a touch panel comprising:

providing the touch panel comprising a driving layer and a sensing layer opposite to the driving layer; the driving layer comprising a first conductive layer and a plurality of driving electrodes located on a side of the first conductive layer along a first direction;

the sensing layer comprising a second conductive layer, a plurality of sensing electrodes and a plurality of button electrodes; the plurality of sensing electrodes and the plurality of button electrodes separately located on two opposite sides of the second conductive layer along a second direction crossed with the first direction; wherein the plurality of driving electrodes, configured for driving the plurality of button electrodes are defined as second driving electrodes; and the other driving electrodes are defined as first driving electrodes;

applying a first driving signal $V_1$ to the first driving electrodes one by one, obtaining a plurality of first electrical signals by scanning the plurality of sensing electrodes one by one, and converting the plurality of first electrical signals into a plurality of first digital signals by digital analog conversion with a first amplified factor κ; and applying a second driving signal $V_2$ to the second driving electrodes one by one, obtaining a plurality of second electrical signals by scanning the plurality of sensing electrodes one by one, and converting the plurality of second electrical signals into a plurality of second digital signals by digital analog conversion with a second amplified factor κ';

wherein the second amplified factor κ' is smaller than the first amplified factor κ, and the second driving signal $V_2$ is smaller than the first driving signal $V_1$.

13. The method as claimed in claim 12, wherein a relationship between the second amplified factor κ' and the first amplified factor κ is: $3V_2 \geq V_1 > V_2$.

14. The method as claimed in claim 12, wherein the relationship between the second amplified factor κ' and the first amplified factor κ is: $3κ \geq κ > κ'$.

15. The method as claimed in claim 12, wherein when the first driving signal V1 is applied to one of the first driving electrodes, and the undriven first driving electrodes and the second driving electrodes are connected to ground or floating.

16. The method as claimed in claim 12, wherein when the second driving signal V2 is applied to one of the second driving electrodes, and the undriven second driving electrodes and the first driving electrodes are connected to ground or floating.

17. The method as claimed in claim 12, wherein a number of the plurality of button electrodes is less than or equal to a number of the plurality of sensing electrodes.

18. The method as claimed in claim 12, wherein the first direction is perpendicular to the second direction.

19. The method as claimed in claim 12, wherein the first conductive layer consists of at least one layer of carbon nanotube film drawn directly from a carbon nanotube array.

20. The method as claimed in claim 19, wherein the at least one layer of carbon nanotube film consists of a plurality of carbon nanotubes joined end to end by van der Waals attractive force therebetween and oriented along the first direction.

* * * * *